(12) United States Patent
Abe et al.

(10) Patent No.: US 6,829,298 B1
(45) Date of Patent: Dec. 7, 2004

(54) SIGNAL PROCESSING CIRCUIT FOR A DIGITAL SIGNAL RECEIVING SYSTEM

(75) Inventors: Yoshinori Abe, Tokyo-to (JP); Kazushi Tahara, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/527,828

(22) Filed: Mar. 17, 2000

(30) Foreign Application Priority Data

Mar. 17, 1999 (JP) ........................................ P11-072630

(51) Int. Cl.⁷ ............................ H03H 7/30; H03H 7/40; H03K 5/159

(52) U.S. Cl. ........................ 375/233; 375/232; 348/607; 708/323

(58) Field of Search ................................ 375/229, 230, 375/232, 233, 235; 333/18, 28 R; 348/607, 726, 725; 708/322, 323

(56) References Cited

U.S. PATENT DOCUMENTS

| | | | | |
|---|---|---|---|---|
| 3,974,449 A | * | 8/1976 | Falconer | 375/233 |
| RE31,351 E | * | 8/1983 | Falconer | 375/235 |
| 5,453,797 A | * | 9/1995 | Nicolas et al. | 348/607 |
| 5,517,526 A | * | 5/1996 | Caudron et al. | 375/232 |
| 5,550,596 A | * | 8/1996 | Strolle et al. | 348/607 |
| 5,648,822 A | * | 7/1997 | Hulyalkar | 348/607 |
| 5,706,057 A | * | 1/1998 | Strolle et al. | 375/240.01 |
| 5,710,792 A | * | 1/1998 | Fukawa et al. | 375/229 |

* cited by examiner

Primary Examiner—Phuong Phu
(74) Attorney, Agent, or Firm—Nixon & Vanderhye, PC

(57) ABSTRACT

A signal processing circuit for a digital signal receiving system includes an equalization unit for performing waveform-equalization of a received signal, the equalization unit including a backward equalizer constituted by a feedback loop; and a phase compensation unit for performing phase compensation of the received signal. The phase compensation unit is arranged upstream of the backward equalizer. Thus, it is possible to avoid the deterioration of the phase compensation ability of the phase compensation unit by the affection from the echo in the transmission path.

22 Claims, 6 Drawing Sheets

SIGNAL PROCESSING CIRCUIT FOR A DIGITAL SIGNAL RECEIVING SYSTEM

BACKGROUND OF THE INVENTION

1. Field of the Invention

The present invention relates to a video/audio decoding technique in conformity with the ATSC (Advanced Television Systems Committee) standard, and more particularly to phase compensation processing in a signal receiving system.

2. Description of Related Art

Recently, there is known ATSC standard as a digital broadcasting standard in the United States. FIG. 1 is a schematic diagram of a system according to the ATSC standard. As illustrated, the transmission system applies the encoding processing onto the video original signal to be transmitted and the audio original signal to be transmitted independently of each other, multiplexes them by a predetermined method and then supplies them to the transmission path encoding and modulating unit. As shown in FIG. 2A, the transmission path encoding and modulating unit applies the data randomizing, the Reed-Solomon encoding, the convolutional data interleaving and the Trellis encoding onto the inputted multiplexed signal. Then, the transmission path encoding and modulating unit adds the sync and further adds the pilot signal, and then applies the equalization and VSB-modulation. Finally, the transmission path encoding and modulating unit transmits the VSB-modulated signal as the RF signal.

On the other hand, the receiving system basically performs the reverse processing to the transmitting system. Namely, the transmission path decoding and demodulating unit shown in FIG. 2B receives the transmitted RF signal and detects the sync and the pilot signal. Then, the transmission path decoding and demodulating unit eliminates the NTSC signal, if necessary, and applies the waveform equalization, the phase processing, the Trellis decoding, the de-interleaving, the Reed-Solomon decoding and the de-randomizing to recover the multiplexed signal of the video signal and the audio signal. Then, the transmission path decoding and demodulating unit de-multiplexes to obtain the video signal and the audio signal, and decodes them to reproduce the video original signal and the audio original signal.

As shown in FIG. 2B, in the receiving system in conformity with the ATSC standard, the output signal from the NTSC rejection filter is subjected to the waveform equalization and then is subjected to the phase compensation by the phase tracker. The waveform equalizer stage is constituted by a feedforward filter and a feedback loop including a slicer and a feedback filter for obtaining estimated transmission symbols. The phase tracker estimates phase error from the signal after the waveform equalization, and compensates for the estimated phase error. However, in such a system, since the waveform equalization stage includes non-linear processing by the feedback loop having the slicer, the estimation capability of the phase error by the phase tracker provided downstream of the waveform equalization stage is deteriorated if large echo exists.

SUMMARY OF THE INVENTION

It is an object of the present invention to provide a waveform equalization and phase compensation circuit in a digital signal receiving system, which is capable of performing accurate phase compensation even if the transmission path includes large echo.

According to one aspect of the present invention, there is provided a signal processing circuit for a digital signal receiving system, including: an equalization unit for performing waveform-equalization of a received signal, the equalization unit including a backward equalizer constituted by a feedback loop; and a phase compensation unit for performing phase compensation of the received signal, wherein the phase compensation unit is arranged upstream of the backward equalizer.

In the signal processing circuit thus configured, since the phase compensation unit is arranged upstream of the backward equalizer, it is possible to avoid the deterioration of the phase compensation ability of the phase compensation unit by the influence from the echo in the transmission path.

Preferably, the equalization unit may further include a forward equalizer, the phase compensation unit being arranged between the forward equalizer and the backward equalizer. Thus, the equalization can be appropriately performed with avoiding the deterioration of the phase compensation ability.

In a preferred embodiment, the backward equalizer may include a slicer for estimating transmission symbols; a feedback equalizer for receiving the estimated transmission symbol from the slicer; and an adder for adding the output of the phase compensation unit to the output of the feedback equalizer and for supplying the result of the addition to the slicer. By this, the deterioration of the phase compensation ability is avoided by arranging the compensation unit upstream of the slicer which includes non-linear processing.

In another preferred embodiment, the backward equalizer may include a Trellis decoder for estimating transmission symbols; a feedback equalizer for receiving the estimated transmission symbol from the Trellis decoder; and an adder for adding the output of the phase compensation unit to the output of the feedback equalizer and for supplying the result of the addition to the Trellis decoder. By this, highly reliable waveform equalization can be achieved by the accurate transmission symbol estimation by the Trellis decoder, with avoiding the deterioration of the deterioration of the phase compensation ability. The Trellis decoder may output Trellis decoding result corresponding to the transmission symbols. Thus, a single Trellis decoder can perform both the transmission symbol estimation for the waveform equalization and the Trellis decoding.

The nature, utility, and further features of this invention will be more clearly apparent from the following detailed description with respect to the preferred embodiments of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

[1] Theoretical Explanation

Figure 3A:
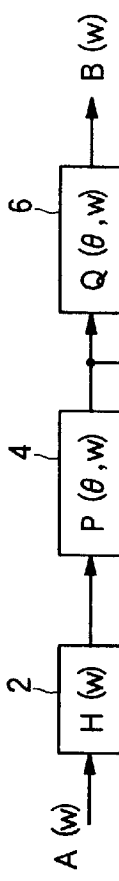
FIGS. 3A to 3C are block diagrams showing examples of arrangements of a phase tracker.

First, the theoretical explanation of the phase compensation processing according to the present invention will be given. FIG. 3A shows a schematic design of the phase tracker. Hereinafter, the description will be made on the frequency area. Now, it is assumed that the transfer function of the channel (i.e., transmission path) is $H(\omega)$. It is also assumed that the signal transmitted from the transmitter of the system is $A(\omega)$, and the signal after the phase error cancellation by the receiver is $B(\omega)$. It is assumed that the channel is ideal and $H(\omega)=1$. Assuming that the phase error caused in the receiver is "θ" and that the transfer function by the phase error "θ" is $P(\theta,\omega)$, the phase tracker is designed such that its transfer function $Q(\theta,\omega)$ becomes as follows:

$$P(\theta,\omega)Q(\theta,\omega)=1, \text{ here } P(0,\omega)=1 \qquad (1)$$

In FIG. 3(A), it is assumed that θ estimating unit 8 estimates the phase error θ caused by the receiver. Assuming that the estimation result is θ', if the estimation is carried out ideally, $$\theta'=\theta \qquad (2)$$

Assuming that the channel is ideal, i.e., $H(\omega)=1$, $$B(\omega)=A(\omega)H(\omega)P(\theta,\omega)Q(\theta,\omega)=A(\omega) \qquad (3).$$

Figure 3B:
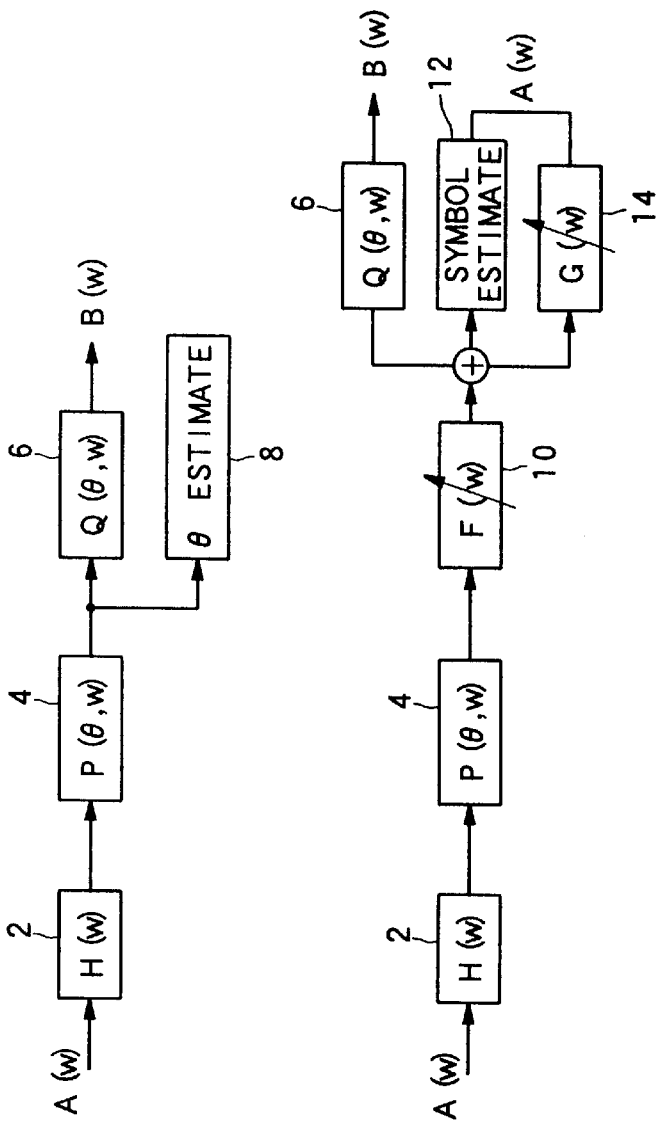

Next, the description will be given of the case where the phase tracker is disposed downstream of the waveform equalizer by referring to FIG. 3B. Here, similarly to the case shown in FIG. 3A, it is assumed that the output signal is $A(\omega)$, the transfer function of the channel is $H(\omega)$ and the transfer function of the phase error caused in the receiver is $P(\theta,\omega)$. The transfer function of the feedforward equalizer 10 is $F(\omega)$, and the transfer function of the feedback equalizer 14 is $G(\omega)$. Also, the output from the transmission symbol estimator 12 is inputted to the feedback equalizer 14, and the estimation result is assumed to be constantly correct and equals to $A(\omega)$. It is noted that the transmission symbol estimator 12 is constituted by a slicer in a system proposed by the aforementioned ATSC standard. In this case, the received signal $B(\omega)$ is:

$$B(\omega)=\{A(\omega)H(\omega)P(\theta,\omega)F(\omega)-A(\omega)G(\omega)\}Q(\theta,\omega) \qquad (4).$$

First, assuming that the system is ideal (i.e., θ=0, and hence $P(\theta,\omega)=P(0,\omega)=1$), since $P(\theta,\omega)=1$ from the equation (1), the equation (4) is modified as:

$$B(\omega) = A(\omega)H(\omega)F(\omega) - A(\omega)G(\omega) \qquad (5)$$
$$= A(\omega)\{H(\omega)F(\omega) - G(\omega)\}$$

Here, $G(\omega)$ is adapted as follows:

$$G(\omega)=H(\omega)F(\omega)-1 \qquad (6)$$

Now, if the phase error actually exists, the equation (5) can be modified as follows by using the equations (4) and (6):

$$B(\omega) = A(\omega)\{H(\omega)P(\theta,\omega)F(\omega) - (H(\omega)F(\omega)-1)\}Q(\theta,\omega) \qquad (7)$$
$$= A(\omega)\{\{H(\omega)F(\omega)-1\}\{P(\theta,\omega)-1\} + P(\theta,\omega)\}Q(\theta,\omega)$$
$$= A(\omega)\{G(\omega)\{P(\theta,\omega)-1\} + P(\theta,\omega)\}Q(\theta,\omega)$$

In the equation (7), if either one of the following equations stands, $B(\omega)$ equals to $A(\omega)$:

$$G(\omega)=0 \qquad (8)$$

$$P(\theta,\omega)-1=0 \qquad (9)$$

The equation (8) indicates that the transfer function of the feedback equalizer 14 is 0(zero), which indicates that there is no post echo (a signal which has larger delay than the main wave). The equation (9) indicates that there is no phase error. Accordingly, in the configuration of FIG. 3B in which the phase tracker is disposed downstream of the waveform equalizer, it is understood that the phase compensation ability is reduced and the equalizer performance is deteriorated if the post echo exists.

Figure 3C:
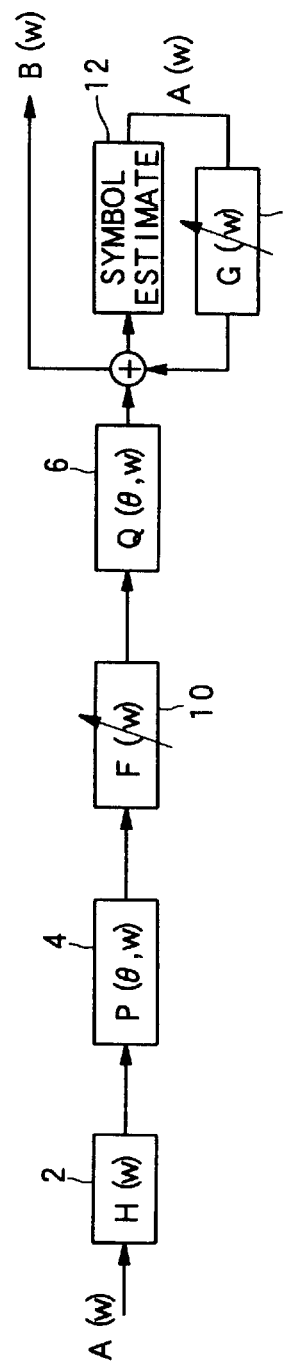

FIG. 3C shows the configuration according to the present invention. As shown, in the present invention, the phase tracker 6 is disposed upstream of the feedback equalizer 14. Also, the output from the transmission symbol estimator 12 is inputted to the feedback equalizer 14, and is assumed to be constantly equal to $A(\omega)$. In this case, the received signal $B(\omega)$ is expressed as follows:

$$B(\omega) = A(\omega)H(\omega)P(\theta,\omega)F(\omega)Q(\theta,\omega) - A(\omega)G(\omega) \qquad (10)$$
$$= A(\omega)H(\omega)P(\theta,\omega)Q(\theta,\omega) - A(\omega)\{H(\omega)F(\omega)-1\}$$
$$= A(\omega)H(\omega)F(\omega)\{P(\theta,\omega)Q(\theta,\omega)-1\} + A(\omega)$$

From the equations (1) and (10), $B(\omega)=A(\omega)$ constantly stands regardless of the echo condition, which means that the equalizer performance never be deteriorated.

As already mentioned, the phase tracker 6 is theoretically designed to cancel out the phase error θ caused in the receiver. Therefore, it is preferable that the phase tracker 6 is arranged in series with the phase error source $P(\theta,\omega)$. In other words, it is theoretically best to arrange the phase tracker 6 at such a position that no non-linear process exists between the phase tracker 6 and the phase error source $P(\theta,\omega)$, and in practice it is preferable to arrange the phase tracker 6 upstream of the backward equalizer including the slicer which performs non-linear process.

[2] 1st. Embodiment

Figure 4:
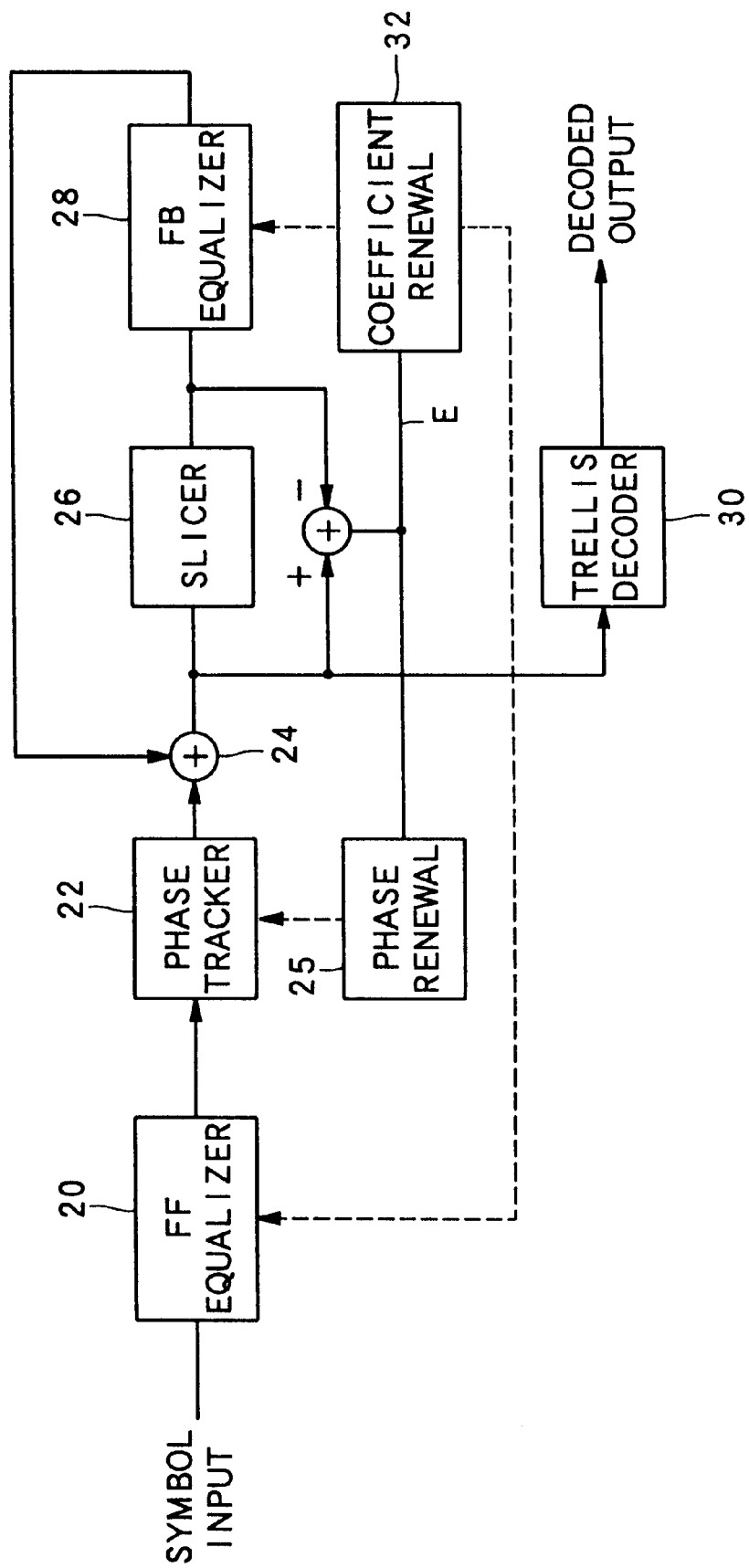
FIG. 4 is a block diagram showing a schematic configuration of a waveform equalization and phase compensation unit according to a first embodiment of the invention.

Next, the embodiment of the waveform equalization and phase compensation according to the present invention will be described. FIG. 4 shows a schematic configuration of the waveform equalization and phase compensation unit according to the first embodiment of the invention. The unit shown in FIG. 4 performs the waveform equalization and the phase compensation, and accomplishes the waveform equalization by the feedforward equalizer 20, the adder 24, the slicer 26 and the feedback equalizer 28. The feedforward equalizer 20 may be a FIR (Finite Impulse Response) filter of variable coefficients, and constitutes a so-called forward equalizer. The feedback loop including the adder 24, the slicer 26 and the feedback equalizer 28 constitutes a so-called backward equalizer. The feedback equalizer 28 may also be a FIR filter of variable coefficients. The phase tracker 22 arranged downstream of the feedforward equalizer 20 performs the phase compensation processing.

Figure 1:
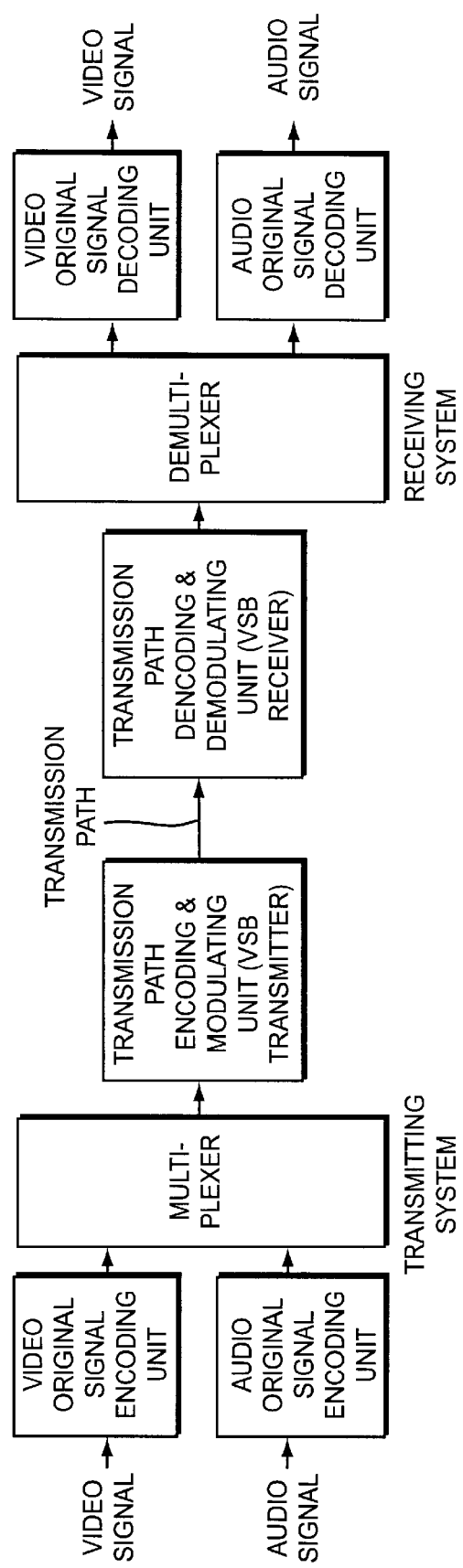
FIG. 1 is a block diagram showing a schematic configuration of a transmitting/receiving system according to ATSC standard.
Figure 2A:
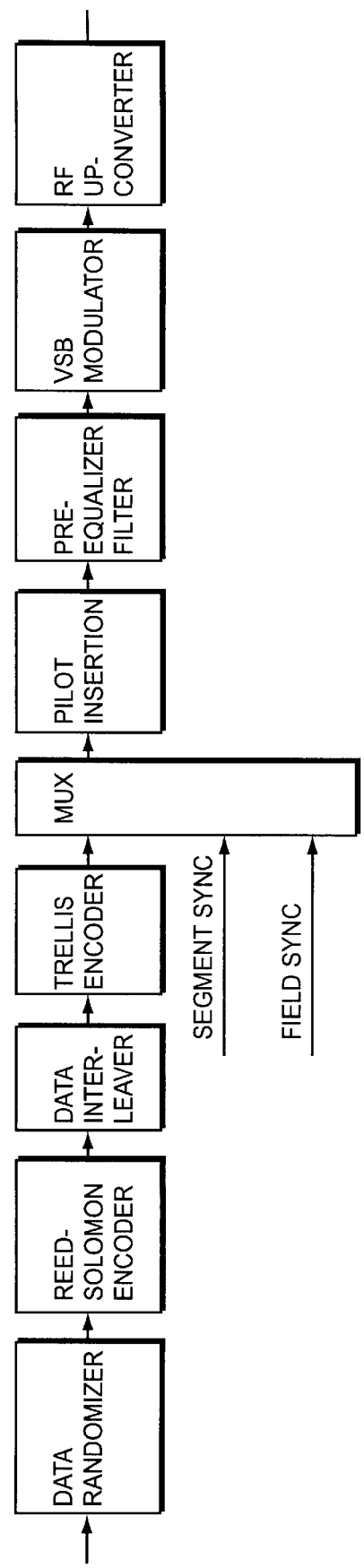
FIG. 2A is a block diagram showing a configuration of the transmission path encoding/modulating unit shown in FIG. 1.
Figure 2B:
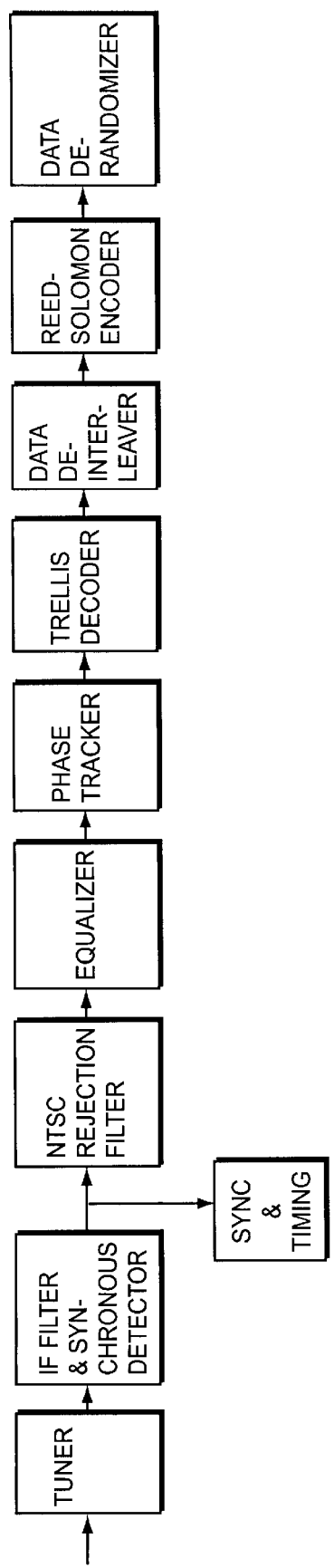
FIG. 2B is a block diagram showing a configuration of the transmission path decoding/demodulating unit shown in FIG. 1.

The symbol input to the feedforward equalizer 20 may be the output from the NTSC rejection filter shown in FIG. 2B. The output of the feedforward equalizer 20 is supplied to the phase tracker 22. The phase tracker 22 corrects the phase error included in the input signal. The phase updating unit 25 controls the phase correction in the phase tracker based on the error E between the input and output of the slicer 26. Thus, the phase error is eliminated. The output of the phase tracker 22 is supplied to the adder 24 and is added to the output from the feedback equalizer 28. The output of the adder 24 is a signal after the waveform equalization and the phase compensation, which is supplied to the slicer 26. The slicer 26 determines the estimated transmission symbol corresponding to the input symbol and supplies it to the feedback equalizer 28. The feedback equalizer, which may be a FIR filter of variable coefficients, operates the estimated echo and supplies it to the adder 24. The error E between the input and the output of the slicer 26 is supplied to the coefficient updating unit 32. The coefficient updating unit 32 updates the tap coefficients of the feedforward equalizer 20 and the feedback equalizer 28 based on the error E by an appropriate coefficient updating algorithm such as a Least Mean Square (LMS) algorithm. The output of the adder 24 is a signal from which the phase error is removed by the phase tracker 22 and to which equalization is applied by the forward and backward equalizers, and is supplied to the Trellis decoder 30. The Trellis decoder 30 performs Trellis decoding and outputs the decoding result. The processing blocks downstream of the Trellis decoder 30 may be as shown in FIG. 2B.

In this embodiment, the phase tracker 22 is arranged upstream of the backward equalizer for performing the waveform equalization. Therefore, as has been theoretically clarified, the phase compensation ability of the phase tracker is not deteriorated due to the echo.

[3] 2nd Embodiment

Figure 5:
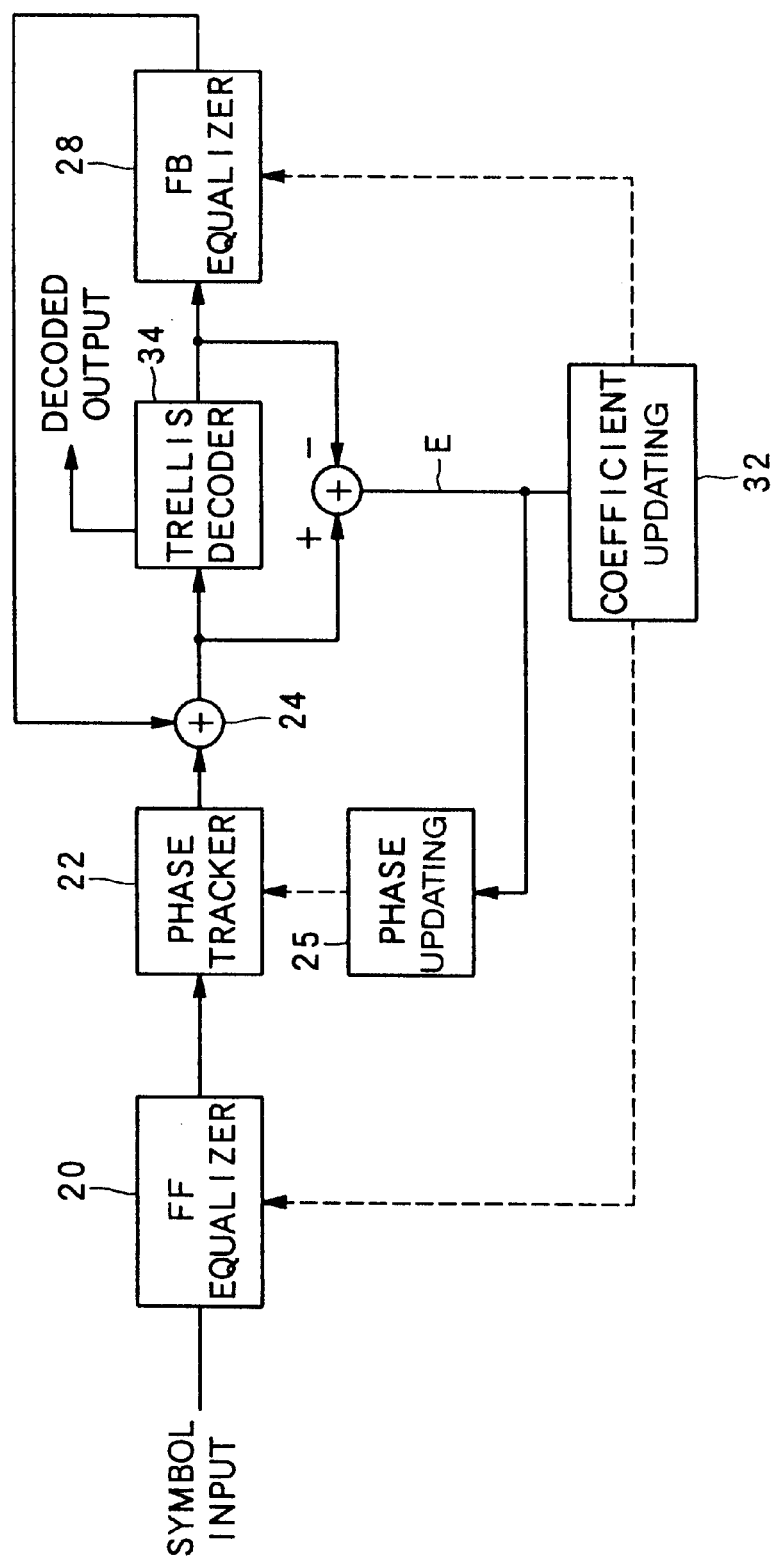
FIG. 5 is a block diagram showing a schematic configuration of a waveform equalization and phase compensation unit according to a second embodiment of the invention.

Next, the schematic configuration of the waveform equalization and phase compensation unit according to a second embodiment of the invention will be described with reference to FIG. 5. In the configuration shown in FIG. 5, the Trellis decoder 34 is included in the feedback loop constituting the backward equalizer so that the Trellis decoder 34 estimates the symbol for the equalization and outputs the Trellis decoding result at the same time. Compared with the configuration shown in FIG. 4, the Trellis decoder 34 performs the function for both the slicer 26 and the Trellis decoder 30. By this configuration, since the symbol estimation result outputted by the Trellis decoder 34 is more accurate than the symbol estimation result by the slicer 26 shown in FIG. 4, the equalization of higher quality may be achieved.

The operation of each component is basically the same as those of the first embodiment shown in FIG. 4. Namely, the feedforward equalizer 20 performs the equalization as the forward equalizer and the phase tracker 22 performs the phase error correction. The adder 24 adds the signal from the phase tracker 22 to the estimated echo from the feedback equalizer 28, and supplies the result to the Trellis decoder 34. The Trellis decoder 34 performs the Trellis decoding to determine the estimated transmission symbol, and supplies it to the feedback equalizer 28. Since the transmission symbol estimation by the Trellis decoder 34 is more accurate than the transmission symbol estimation by the slicer, the error signal between the input and the output of the Trellis decoder 34 has higher accuracy, and this improves the accuracy of the updating processing of the phase updating unit 25 and the coefficient updating unit 32. Further, the Trellis decoder 34 outputs the decoding result signal which is supplied to the downstream processing unit shown in FIG. 2B, like the first embodiment. Thus, since the phase tracker is arranged upstream of the backward equalizer in the second embodiment, the phase error correction ability is not deteriorated even if the echo is present.

As described above, according to the present invention, in the phase compensation processing of a digital signal receiver, the phase compensation unit is arranged upstream of the backward equalizer of the waveform equalization unit. Therefore, highly accurate phase error compensation may be achieved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 11-072630 filed on Mar. 17, 1999 including the specification, claims, drawings and summary is incorporated herein by reference in its entirety.

What is claimed is:

1. A signal processing circuit for a received VSB-modulated signal in a digital signal receiving system, comprising:

an equalization unit for performing waveform-equalization of the received signal, the equalization unit including a backward equalizer comprising a feedback loop;

a phase track unit for performing phase correction of the received signal, wherein the phase track unit is arranged upstream of the backward equalizer;

a phase updating unit for controlling the phase correction of the phase track unit based on an error signal from an error detection circuit of the backward equalizer; and a coefficient updating unit for updating a coefficient of the backward equalizer based on the error signal from the error detection circuit.

2. A circuit according to claim 1, wherein the equalization unit further comprises a forward equalizer, the phase track unit being arranged between the forward equalizer and the backward equalizer.

3. A circuit according to claim 1, wherein the backward equalizer comprises:

a slicer for estimating transmission symbols;

a feedback equalizer for receiving the estimated transmission symbols from the slicer; and an adder for adding the output of the phase track unit to the output of the feedback equalizer and for supplying the result of the addition to the slicer.

4. A circuit according to claim 1, wherein the backward equalizer comprises:

a Trellis decoder for performing Trellis decoding to provide estimated transmission symbols;

a feedback equalizer for receiving the estimated transmission symbols from the Trellis decoder; and an adder for adding the output of the phase track unit to the output of the feedback equalizer and for supplying the result of the addition to the Trellis decoder.

5. A circuit according to claim 4, wherein the Trellis decoder outputs a Trellis decoding result corresponding to the transmission symbols.

6. A signal processing circuit for a digital signal receiving system, comprising:

a backward equalizer for equalizing a Vestigial Sideband (VSB)-modulated signal;

a phase tracking circuit arranged upstream of the backward equalizer for phase correcting the VSB-modulated signal;

a phase updating circuit for controlling the phase correcting of the phase tracking circuit based on an error signal from an error detection circuit of the backward equalizer; and a coefficient updating circuit for updating coefficients of the backward equalizer based on the error signal from the error detection circuit.

7. A circuit according to claim 6, further comprising:

a forward equalizer, wherein the phase tracking circuit is arranged between the forward equalizer and the backward equalizer.

8. A circuit according to claim 6, wherein the backward equalizer comprises:

a slicer for estimating signals supplied thereto;

a feedback equalizer receiving the estimated signals from the slicer; and an adder for adding the output of the phase tracking circuit to the output of the feedback equalizer and supplying the result to the slicer.

9. A circuit according to claim 6, wherein the backward equalizer comprises:

a Trellis decoder for performing Trellis decoding to provide estimated signals;

a feedback equalizer receiving the estimated signals from the Trellis decoder; and an adder for adding the output of the phase tracking circuit to the output of the feedback equalizer and supplying the result to the Trellis decoder.

10. A circuit according to claim 9, wherein the Trellis decoder outputs a Trellis decoding result corresponding to signals supplied thereto.

11. A signal processing circuit for a digital signal receiving system, comprising:

means for equalizing a Vestigial Sideband (VSB)-modulated signal;

means arranged upstream of the backward equalizer for phase correcting the VSB signal;

means for controlling the phase correcting of the phase tracking circuit based on an error signal from an error detecting means of the means for equalizing; and means for updating coefficients of the backward equalizer based on the error signal from the error detecting means.

12. A circuit according to claim 3, further comprising:

a decoder coupled to an input-side of the slicer for receiving an input signal from the input-side of the slicer.

13. A circuit according to claim 8, further comprising:

a decoder coupled to an input-side of the slicer for receiving an input signal from the input-side of the slicer.

14. A signal processing circuit for a received signal in a digital signal receiving system, comprising:

an equalization unit for performing waveform-equalization of the received signal, the equalization unit including a backward equalizer;

a phase track unit for phase correcting the received signal, wherein the phase track unit is arranged upstream of the backward equalizer;

a phase updating unit for controlling the phase correcting of the phase track unit based on an error signal from an error detection circuit of the backward equalizer; and a coefficient updating unit for updating a coefficient of the backward equalizer based on the error signal from the error detection circuit.

15. A circuit according to claim 14, wherein the backward equalizer comprises:

slicer for estimating signals supplied thereto;

a feedback equalizer receiving the estimated signals from the slicer; and an adder for adding the output of the phase tracking circuit to the output of the feedback equalizer and supplying the result to the slicer.

16. A circuit according to claim 15, further comprising:

a decoder coupled to an input-side of the slicer for receiving an input signal from the input-side of the slicer.

17. A circuit according to claim 14, wherein the backward equalizer comprises:

a Trellis decoder for estimating signals supplied thereto;

a feedback equalizer receiving the estimated signals from the Trellis decoder; and an adder for adding the output of the phase tracking circuit to the output of the feedback equalizer and supplying the result to the Trellis decoder.

18. A signal processing circuit for a received signal in a digital signal receiving system, comprising:

a phase track unit for phase correcting the received signal;

a slicer arranged downstream of the phase track unit;

a feedback equalizer arranged downstream of the slicer;

a signal combining circuit arranged in a signal path between the phase track unit and the slicer for combining an output of the feedback equalizer and an output of the phase track unit;

a phase updating unit for controlling the phase correcting of the phase track unit based on an error signal developed by an error detection circuit based on an input signal and an output signal of the slicer; and a coefficient updating unit for updating a coefficient of the feedback equalizer based on the error signal from the error detection circuit.

19. A circuit according to claim 18, further comprising:

a decoder coupled to the input-side of the slicer for receiving an input signal from the input-side of the slicer.

20. A circuit according to claim 18, further comprising:

a feedforward equalizer arranged upstream of the phase track unit, wherein the coefficient updating unit updates a coefficient of the feedforward equalizer based on the error signal.

21. A signal processing circuit for a received signal in a digital signal receiving system, comprising:

a phase track unit for phase correcting the received signal;

a Trellis decoder arranged downstream of the phase track unit;

a feedback equalizer arranged downstream of the Trellis decoder;

a signal combining circuit arranged in a signal path between the phase track unit and the Trellis decoder for combining an output of the feedback equalizer and an output of the phase track unit;

a phase updating unit for controlling the phase correcting of the phase track unit based on an error signal developed from an input signal and an output signal of the Trellis decoder; and a coefficient updating unit for updating a coefficient of the feedback equalizer based on the error signal.

22. A circuit according to claim 21, further comprising:

a feedforward equalizer arranged upstream of the phase track unit, wherein the coefficient updating unit updates a coefficient of the feedforward equalizer based on the error signal.

* * * * *